(12) United States Patent
Verstak et al.

(10) Patent No.: US 8,473,487 B1
(45) Date of Patent: *Jun. 25, 2013

(54) DOCUMENT SEARCH IN AFFILIATED LIBRARIES

(75) Inventors: Alexandre A. Verstak, Cupertino, CA (US); Anurag Acharya, Campbell, CA (US)

(73) Assignee: Google Inc., Mountain View, CA (US)

( * ) Notice: Subject to any disclaimer, the term of this patent is extended or adjusted under 35 U.S.C. 154(b) by 713 days.

This patent is subject to a terminal disclaimer.

(21) Appl. No.: 12/419,872

(22) Filed: Apr. 7, 2009

Related U.S. Application Data

(63) Continuation of application No. 11/432,039, filed on May 10, 2006, now Pat. No. 7,526,475.

(60) Provisional application No. 60/778,256, filed on Mar. 1, 2006.

(51) Int. Cl.
*G06F 17/30* (2006.01)

(52) U.S. Cl.
USPC .......................................... 707/723; 715/853

(58) Field of Classification Search
USPC ................... 707/632, 726, 723; 715/853, 200
See application file for complete search history.

(56) References Cited

U.S. PATENT DOCUMENTS

| | | | |
|---|---|---|---|
| 6,049,799 A * | 4/2000 | Mangat et al. | 1/1 |
| 6,341,290 B1 * | 1/2002 | Lombardo et al. | 1/1 |
| 6,523,044 B1 * | 2/2003 | Muramoto et al. | 1/1 |
| 6,701,343 B1 * | 3/2004 | Kenyon | 709/204 |
| 6,915,265 B1 * | 7/2005 | Johnson | 705/2 |
| 7,526,475 B1 * | 4/2009 | Verstak et al. | 1/1 |
| 7,599,950 B2 * | 10/2009 | Walther et al. | 1/1 |
| 8,316,449 B2 * | 11/2012 | Ginter et al. | 726/26 |
| 8,332,740 B2 * | 12/2012 | Graham | 715/200 |
| 8,381,134 B2 * | 2/2013 | Weise et al. | 715/853 |
| 2010/0131902 A1 * | 5/2010 | Teran et al. | 715/843 |
| 2010/0153416 A1 * | 6/2010 | Gur-esh et al. | 707/758 |
| 2012/0321271 A1 * | 12/2012 | Baldwin et al. | 386/201 |
| 2012/0331567 A1 * | 12/2012 | Shelton | 726/28 |

* cited by examiner

*Primary Examiner* — Jean M Corrielus
(74) *Attorney, Agent, or Firm* — Fenwick & West LLP (57) ABSTRACT

An online search system generates an index of documents using index information received from a library. Some documents have restricted access; some documents may not be available online. The search system provides links to documents in the library as well as other sites based on a search, and may include link resolvers received from the library. The search system provides access links to the link resolvers if an identifier, such as a user identification or IP address, matches an affiliation list from the library.

12 Claims, 7 Drawing Sheets

Google Scholar BETA

"theory of relativity" "space travel" [Search]

Advanced Scholar Search
Scholar Preferences
Scholar Help

Scholar Results 1 - 10 of about 149 for "theory of relativity" "space travel". (0.04 seconds)

Chronology protection conjecture - Find it@Stanford - FindIt @ Harvard — 512
SW Hawking - Physical Review D, 1992 - link.aps.org
... Of course, in the theory of relativity, time travel and faster- than-light space travel are closely connected. If you can do one, you can do the other. ...
Cited by 280 - Web Search - adsabs.harvard.edu - adsabs.harvard.edu - ncbi.nlm.nih.gov Hyperbolic Motion in Curved Space Time - Find it@Stanford - FindIt @ Harvard
W Rindler - Physical Review, 1960 - link.aps.org
... Indeed, on the basis of the general theory of relativity, the problem seems extraor ...
to compute a few of the numerical values involved in possible space travel. ...
Cited by 19 - Web Search - adsabs.harvard.edu Design and characterization of complementary Gaussian reflectivity mirrors - Find it@Stanford - FindIt @ Harvard
P Lavigne, N McCarthy, JG Demers - Appl. Opt, 1985 - ao.osa.org
Page 1. Design and characterization of complementary Gaussian reflectivity mirrors
Pierre Lavigne, Nathalie McCarthy, and Jean-Guy Demers ...
Cited by 18 - Web Search - aoot.osa.org - ao.osa.org - adsabs.harvard.edu - all 6 versions »

DOCUMENT SEARCH IN AFFILIATED LIBRARIES

CROSS REFERENCE TO RELATED APPLICATION

This application is a continuation of U.S. patent application Ser. No. 11/432,039, filed on May 10, 2006, which claims priority to U.S. Provisional Patent Application No. 60/778,256, filed Mar. 1, 2006, both of which are herein incorporated by reference.

BACKGROUND

1. Field of the Invention

The present invention generally relates to the field of information retrieval systems, and more specifically, to information retrieval systems for searching libraries having restricted access documents.

2. Description of the Related Art

Information retrieval systems, generally called search engines, are now an essential tool for finding information in large scale, diverse, and growing corpuses such as the World Wide Web. Generally, search engines create an index that relates documents (or "pages") to the individual words present in each document. A document is retrieved in response to a query containing a number of query terms, typically based on having some number of query terms present in the document.

Libraries have documents from many sources and in many forms, including non-electronic format. Some libraries also provide online access to the underlying documents themselves. Libraries may restrict online user access to documents (here including books, journals, periodicals or other media which have been converted to electronically accessible forms) depending on a relationship between the library and the user. For example, students and faculty may get full online access to a university library's holdings.

Many users start their information seeking process using general search engines to identify a set of documents relevant to their information needs. In some cases, these documents are likely to be included in the online holdings of one or more libraries. However, most conventional search engines do not index the holdings of libraries, and thus do not include documents in such libraries in search results. Even among search engines that can index library holdings, these search engines are generally precluded from providing access to documents within these holdings from the search results provided to the user.

SUMMARY

The present invention provides a search system and methodology for searching documents in a data repository and providing as part of the search results an access link to documents in the library that have restricted access. The access link is provided where a user identifier indicates the user requesting the search is allowed to have access to the documents in the library.

In one embodiment, a library provides holding information and affiliation information to a search engine system. The holding information identifies the various documents for which the library provides online access. Associated with the holding information is affiliation information indicating which users are allowed to access the holdings. The holding information is indexed in a library index. When a query is received from a user, a primary document index is searched to retrieve a set of search result documents relevant to the query. A user identifier associated with the user is used to identify with which libraries the user is affiliated. Where a search result document is held with the holdings of a library affiliated with the user, the search result is augmented to include an access link to the library. The user can then access the document from the library's online system.

In one embodiment, a query and a user identifier identifying a user is received from the user and transmitted to a search system. Holding information and affiliation information of a plurality of libraries are also received and transmitted to the search system. A search result for the query is received from the search system. The search result includes a document relevant to the query and available in one of the plurality of libraries which is affiliated to the user and to which the user is allowed access. The search result also includes a document relevant to the query and available from a non-library website. The search result is transmitted to the user in response to the received query.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The disclosed embodiments describe a search system and methodology for searching for documents in a data repository and a library. If a user identifier indicates the user is to have access to the documents in the library, and a link to documents in the library that have restricted access is provided as part of the search result. The library provides holding information and an affiliation list of users having access to documents in the document list.

Figure 1:
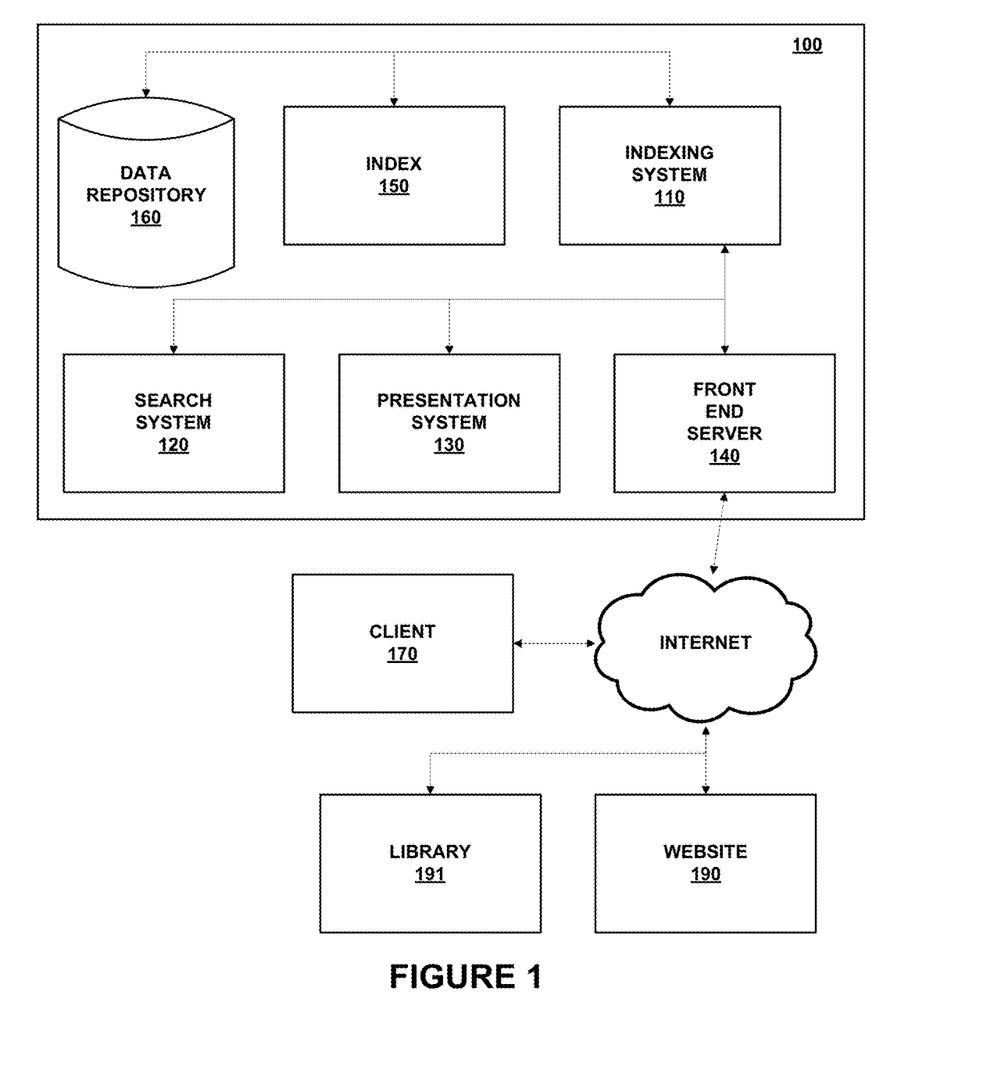
FIG. 1 is a block diagram illustrating the software architecture of a search system according to the present invention.

Referring now to FIG. 1, there is shown the software architecture of a search system 100 in accordance with the present invention. The search system 100 includes an indexing system 110, a search system 120, a presentation system 130, and a front end server 140. The system is further communicatively coupled over a network (e.g., the Internet) to various library systems 191.

The indexing system 110 identifies words or terms in documents, and indexes documents according to the words or terms, by accessing various websites 190, libraries 191, and other document collections. The resulting index is a primary document index. Each library 191 provides holding information of the documents in the library and an affiliation list of users that can access the holdings in the library. A library 191 may provide multiple sets of holding information and corresponding affiliation lists; for example a library 191 can provide holding information related to a medical school library and an affiliation lists for users with access to these medical documents, and separate holding information and affiliation list related to a law school library and users with access to these legal documents. A given combination of holding information and affiliation list may be for a physical library, for a specific collection within a library, for a virtual collection with (or across physical libraries), as well as for collections existing at multiple different physical locations, institutions or the like. Similarly, the affiliation list can be for individuals associated with particular schools, institutions, agencies, or portions thereof, as well as for groups of users meeting predetermined membership criteria. The holding list may include documents that are publicly available for all users, as well as documents contained in restricted access collections. These restricted access documents may be restricted to particular types of users (e.g., students, faculty, and those with special access privileges). The restricted access documents may also be those for which a fee is required for access.

Figure 7:
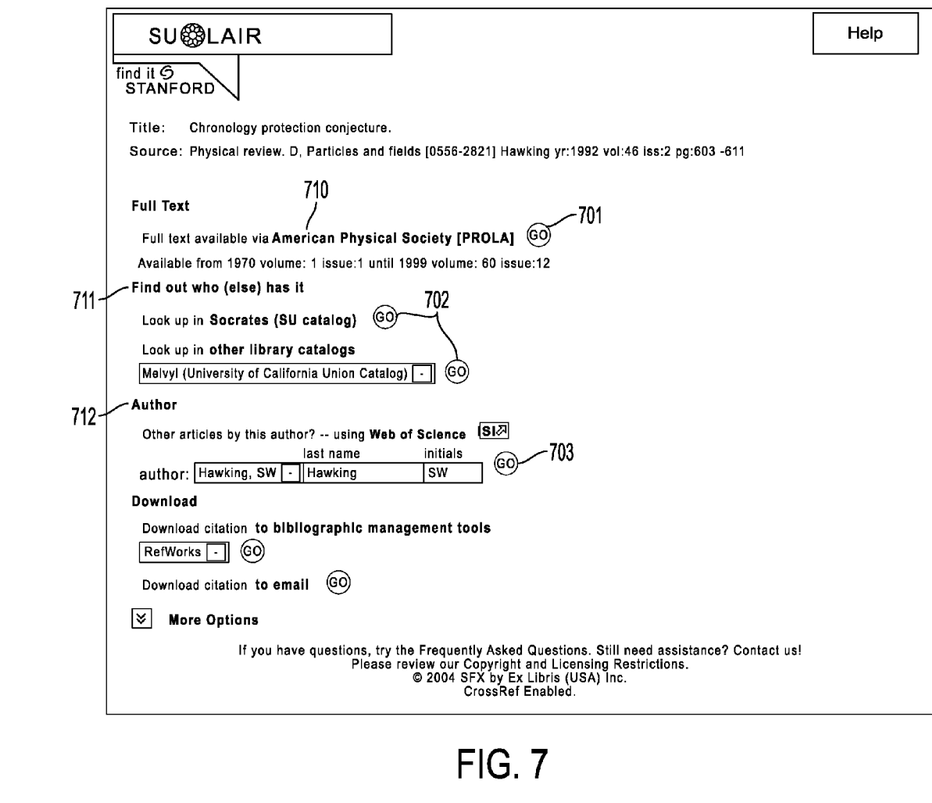
FIG. 7 is a screenshot of the resultant documents of the methodology of FIG. 6.

The indexing system 110 generates a library index using the holding information. The presentation system 130 presents search results with access links to link resolvers for documents in the library based on a search and a match of a user identifier of the user and the affiliation list. The access link provides to the link resolver document information that is used by the link resolver to retrieve the document from the library; the link resolve can provide a user interface for accessing the document, such as shown in FIG. 7. The library 191 may be, for example, a specific library, a national library, a collection of libraries, a membership organization, an ISP (internet service provider) that provides online access to documents as a benefit for providing internet access, or a government department that licenses on behalf of all residents of a nation or region. Any number of websites 190 and libraries 191 may be connected to the Internet, but for the sake of clarity only one website 190 and one library 191 are shown.

The front end server 140 receives queries from a user of a client 170, and provides those queries to the search system 120. The search system 120 searches for documents relevant to the search query (search results), including identifying any query terms in the search query, and then ranking the documents in the search results according to a suitable information retrieval scoring algorithm. The search system 120 provides the search results to the presentation system 130. The presentation system 130 modifies the search results, generates summaries of the documents, and provides the modified search results back to the front end server 140, which provides the results to the client 170. The system 100 further includes an index 150 that stores the indexing information pertaining to documents and a data repository 160 of the indexed documents.

In the context of this description, "documents" are understood to be any type of media that can be indexed and retrieved by a search engine, including web pages, images, multimedia files, text documents, PDFs or other image formatted files, video files, audio files, and so forth. A document may have one or more pages, partitions, segments or other components, as appropriate to its content and type. Equivalently a document may be referred to as a "page," as commonly used to refer to documents on the Internet. No limitation as to the scope of the invention is implied by the use of the generic term "documents." The search system 100 operates over a large corpus of documents, such as the Internet and World Wide Web, but can likewise be used in more limited collections, such as for the document collections of a library or private enterprises. In either context, it will be appreciated that the documents are typically distributed across many different computer systems and sites. Without loss of generality then, the documents generally, regardless of format or location (e.g., which website or database) will be collectively referred to as a corpus or document collection. Each document has an associated identifier that uniquely identifies the document; the identifier is preferably a URL, but other types of identifiers (e.g., document numbers) may be used as well. In this disclosure, the use of URLs to identify documents is assumed.

The document collection may include scholarly literature, such as journal articles, conference articles, academic papers and citation records of journal articles, conference articles, and academic papers. Because works of scholarly literature are subject to rigorous format requirements, such documents have metadata information describing the content and source of the document. The document metadata includes names of authors, title, publisher, publication date, publication location, citation information, article identifiers such as Digital Object Identifier, PubMed Identifier, SICI, ISBN, and the like, network location (e.g., URL), number of references, number of citations, language, and the like.

Figure 2:
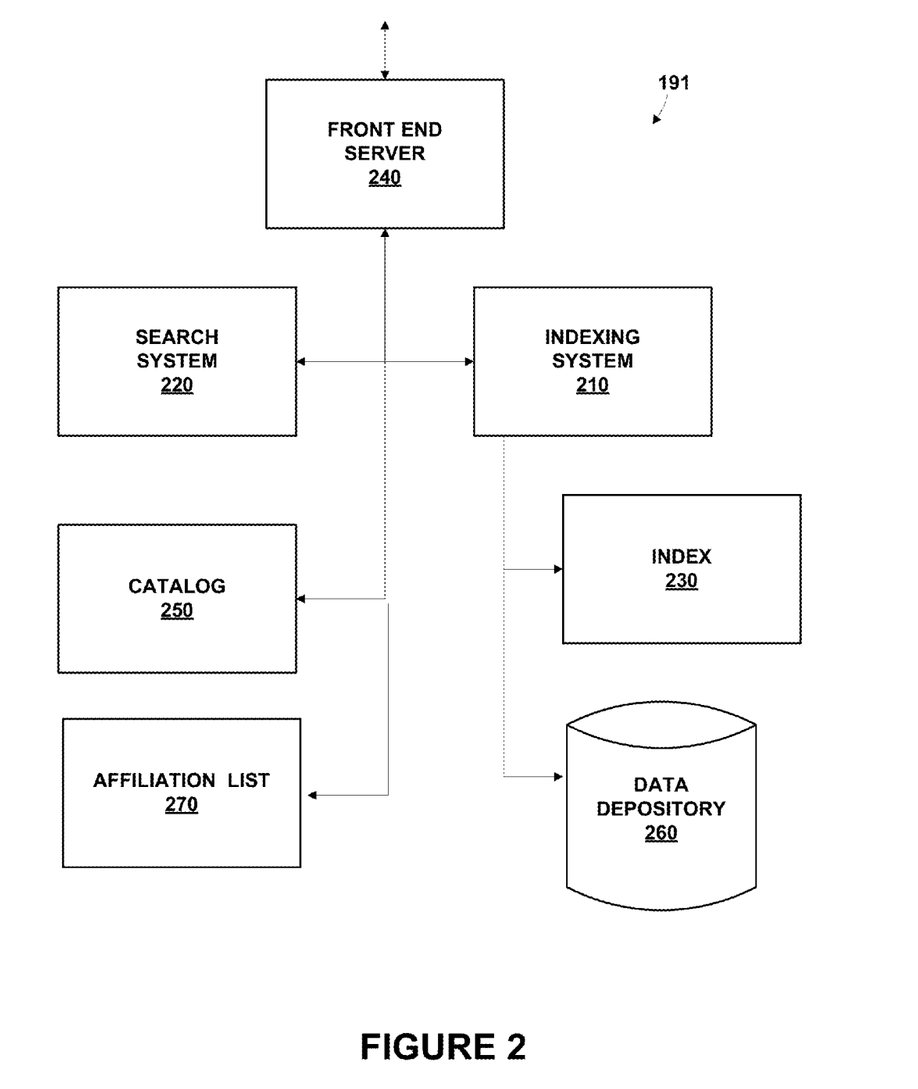
FIG. 2 is a block diagram illustrating the software architecture of a search system of a library.

Referring now to FIG. 2, there is shown the software architecture of the library 191. The library 191 includes an indexing system 210, a search system 220, an index 230, a front end server 240, a catalog 250, a data depository 260, and an affiliation list 270. The indexing system 210 identifies words or terms in documents, and indexes documents according to the words or terms, by accessing data collections in the data depository 260. The front end server 240 receives queries from a user of a client 170 or from the search system 100, and provides the queries to the search system 220. The search system 220 functions in a similar manner as the search system 120 (see FIG. 1) but uses the indexing system 210 with the index 230 for searching the data depository 260. The search system 220 provides the search results through the front end server 240 for transmission to either the search system 100 or directly to the client 170.

The library 191 provides to the search system 100 holding information of the documents in the library and the affiliation list 270 of users that can access the holdings in the library. The holding information may include information for documents available on line or off line, such as books, periodicals, reference materials, images, and recordings. The holding information may include, for example, author, title, name, volume, and issue for a periodical, and author, title, publisher, ISBN, date for a book. The affiliation list 270 includes identifiers of users that are allowed access to the documents in described in the holding information. The identifiers may be, for example, IP addresses, IP address ranges, IP address patterns, or geographic region information. In one embodiment, the holding information may include information related to link resolvers that provide an addresses and document information for linking documents in the library 191. In one embodiment, the holding information includes indexing information for the indexing system 110 to include in a library index 150. The search system 100 evaluates the search results and provides the access links to corresponding link resolvers for documents included in the library 191 based on the affiliation list.

Figure 3:
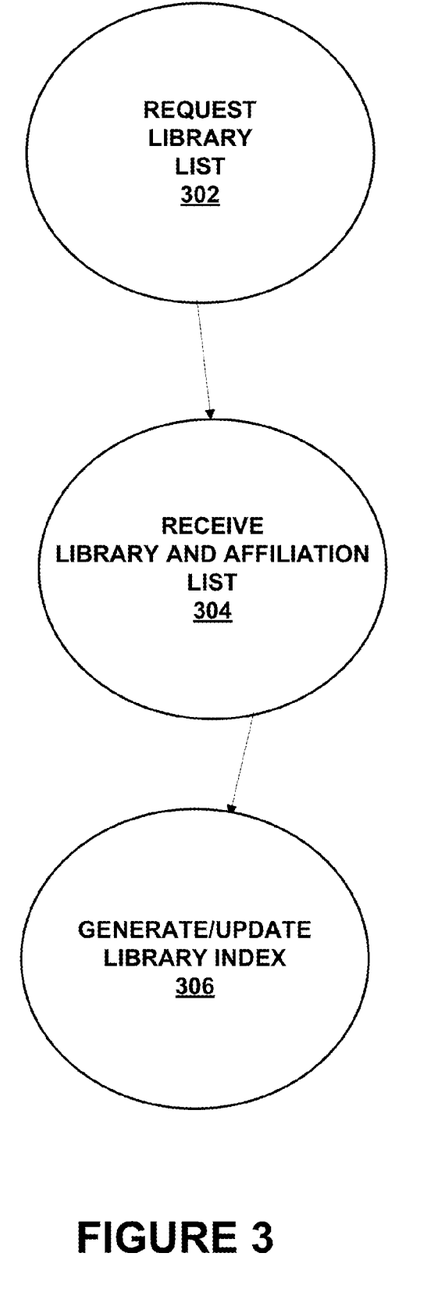
FIG. 3 illustrates generation of a library index of the search system of FIG. 1.

Referring now to FIG. 3, there is shown a flowchart of generation of a library index of the index 150 of the search system 100. The search system 100 requests 302 a library list of holding information from the library 191. The search system 100 receives 304 the library list and an affiliation list from the library 191, and generates 306 a library index or updates 306 the library index if it already exists. In one embodiment, the library list includes the contents of a hard copy card catalog and the contents of electronic catalogs of documents in the library, and information related to link resolvers for the documents. The index may be an inverted index that identifies each 'holding" (e.g., a journal and volume/data range), and a list of the libraries/institutions at which the holding is available. There is also then for each such library the affiliation information.

Figure 4:
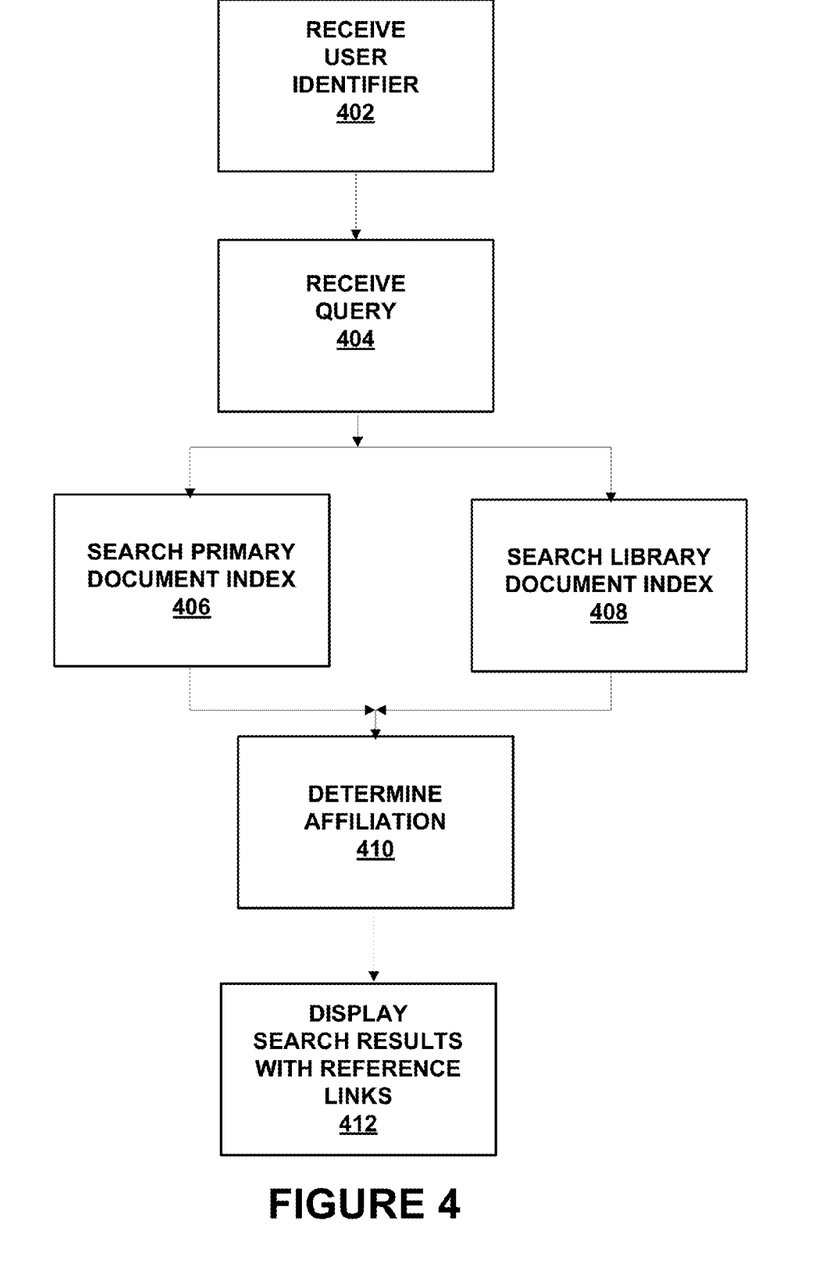
FIG. 4 is a flowchart illustrating an exemplary methodology for generating search results for library documents.

Referring now to FIG. 4, there is shown a flow chart of one method for generating search results for library documents. The search system 120 receives 402 a user identifier and receives 404 a query. The user identifier may be received from a cookie file on the user's computer, and may include a unique user ID, IP address information, or any other information useful to identify the user. The search system 120 searches 406 a primary document index of the index 150 to retrieve a set of documents relevant to the query terms. The search system 120 also uses the user identifier and the library index to determine 410 the libraries with which the user is affiliated (e.g., has access to its holding) and retrieves for these libraries their holding information. The search system 120 compares search result documents to the retrieved holding information to determine for each document, which of the libraries that the user is affiliated with contains the document. Where a library that the user is affiliated with contains the search result document, an access link to a link resolver for that library is constructed and associated with the search result for presentation to the user. The determination 410 is described in FIG. 6.

Figure 6:
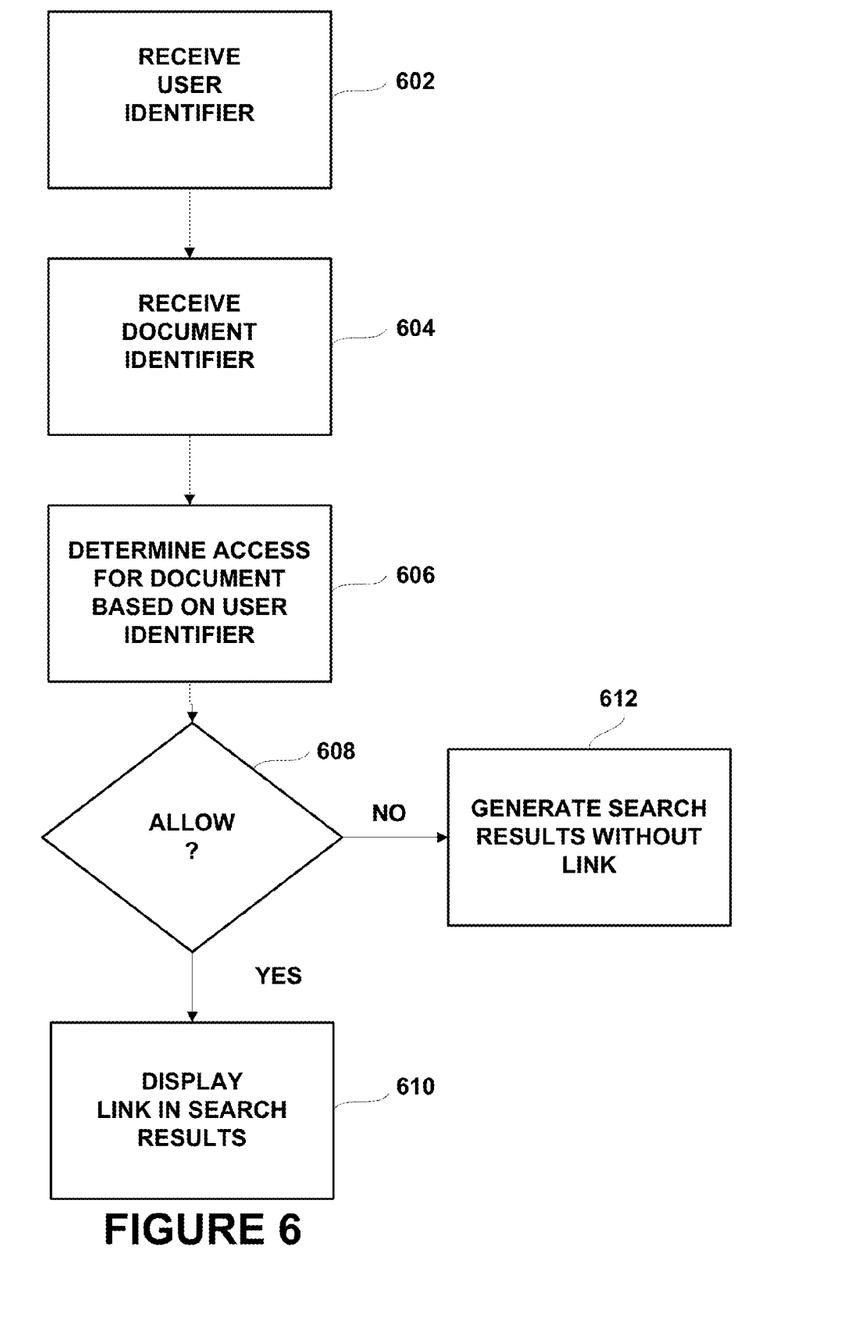
FIG. 6 is a flowchart illustrating an exemplary methodology for determining whether to grant access to a library in response to search results.

Referring now to FIG. 6, there is shown a flowchart illustrating the exemplary methodology for determining whether to include an access link to a document in a library in the search results. The presentation system 130 receives 602 the user identifier and receives 604 the document identifier. The presentation system 130 determines 606 whether or not the user is to be provided an access link to the document by comparing the user identifier to the user identifiers in the affiliation list. If access is allowed 608, the presentation system 130 provides 610 an access link to a link resolver for displaying in the search results. The access link contains a query string that identifies the document in a way that can be resolved by the host library system to obtain online access. Otherwise if access is not allowed 608, the presentation system 130 generates 612 the search results without the link. The receive 604 is repeated for each document found in the library.

Figure 5:
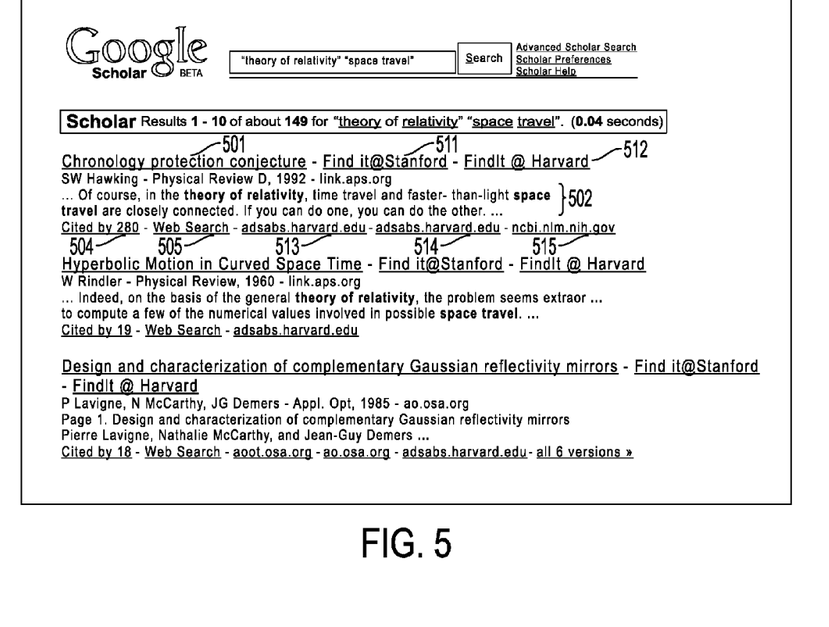
FIG. 5 is a screenshot of the search system of FIG. 1.

Referring again to FIG. 4, the presentation system 130 displays 412 the search results with access links 511 and 512 to documents that are the user has access to because of an affiliation with the library, as shown in FIG. 5.

FIG. 5 illustrates one embodiment of a user interface for displaying search results. Here, in response to a query for ""theory of relativity" "space travel"", the search system 120 retrieves, and the presentation system 130 generates a page illustrating a plurality of search result elements for documents retrieved by the search system. Each search result element includes a link 501 to the document from the search result (e.g., "Chronology protection conjecture" by SW Hawking and published in Physical Review in 1992). The search result element further includes a snippet 502 of portions of the document with the query terms, a link 504 to a page of documents citing the search result document, and a link element 505 for a web search for the document.

The search result element further includes library links 511-515 to specific libraries. In one embodiment, the links 511 and 512 are access links to the libraries that the user is allowed access due to the user's affiliation with the libraries. In this example, the user is affiliated with the libraries at Harvard and Stanford universities; each of these libraries would have provided holding information that identified that the journal "Physical Review" for the period including 1992, and affiliation information that identified the user as permitted to access this particular journal. The links 511 and 512 may be access links to link resolvers. The links 511 and 512 may be displayed with different type sizes or in different fonts. For example, links 511 and 512 are shown with larger type size than links 513, 514, and 515. The location and size of the link is determined by the level of access provided by the library. For example, a library that provides greater access to the document may get larger size links. Also the links may be disposed in different locations of the search result element. For example, links 511 and 512 are shown with in the upper portion of the search result element by the link 501, while links 513, 514, and 515 are shown below the snippet 502 along with other links (e.g., 504 and 505). If the user selects the link 511, the link 511 links the user to a link resolver for the document in the library 191.

FIG. 7 is a screenshot of a page from a library system 191 providing information about a document indicated in a search result, such as by selecting link 511, and available through the library 191, in this example the library system 191 at Stanford University. A screen element 710 indicates the location of the document, e.g., the American Physical Society and a link 701 to a document collection maintained by the Society for gaining access to the document. A screen element 711 indicates other sources for the document with links 702 to other catalogs. A screen element 712 indicates the other documents with a link 703 to other articles by the author.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for searching documents, the method comprising:
   receiving a query from a client device, the query being associated with a user;
   receiving a user identifier identifying the user;
   receiving holding information and affiliation information from one or more libraries, the holding information describing holdings held by each library, the affiliation information comprising user identifiers associated with users having access to the holdings, wherein one of the libraries is affiliated with the user;
   transmitting the query, the user identifier, the holding information, and the affiliation information to a search system;
   receiving a search result from the search system, the search result comprising:
      a document relevant to the query and available to the user in the library affiliated with the user and to which the user is allowed access; and
      a document relevant to the query and available from a non-library website; and
   transmitting the search result to the client device in response to the received query.

2. The method of claim 1, wherein the holding information includes information regarding online and offline availability of documents associated with the holding information.

3. The method of claim 1, wherein the search result includes an access link for the document available to the user in the library affiliated with the user, the access link linking to the document in the library affiliated with the user.

4. The method of claim 3, wherein the library affiliated with the user has a link resolver, and wherein the access link links to the link resolver of the library and contains information identifying the document held in the library.

5. A system for searching documents, the system comprising:
   a processor for executing computer programs; and
   a computer-readable storage medium storing computer program instructions, executable by the processor, to configure the processor to perform the steps of:
      receiving a query from a client device, the query being associated with a user;
      receiving a user identifier uniquely identifying the user;
      receiving holding information and affiliation information from one or more libraries, the holding information describing holdings held by each library, the affiliation information comprising user identifiers associated with users having access to the holdings, wherein one of the libraries is affiliated with the user;
      transmitting the query, the user identifier, the holding information, and the affiliation information to a search system;
      receiving a search result from the search system, the search result including a document relevant to the query and available to the user in the library affiliated with the user and to which the user is allowed access, and a document relevant to the query and available from a non-library website; and
      transmitting the search result to the client device in response to the received query.

6. The system of claim 5, wherein the holding information includes information regarding online and offline availability of documents associated with the holding information.

7. The system of claim 5, wherein the search result includes an access link for the document available to the user in the library affiliated with the user, the access link linking to the document in the library affiliated with the user.

8. The system of claim 7, wherein the library affiliated with the user has a link resolver, and wherein the access link links to the link resolver of the library and contains information identifying the document held in the library.

9. A non-transitory computer-readable storage medium comprising executable computer program code for controlling a processor to perform the steps of:

receiving a query from a client device, the query being associated with a user;

receiving a user identifier identifying the user;

receiving holding information and affiliation information from one or more libraries, the holding information describing holdings held by each library, the affiliation information comprising user identifiers associated with users having access to the holdings, wherein one of the libraries is affiliated with the user;

transmitting the query, the user identifier, the holding information, and the affiliation information to a search system;

receiving a search result from the search system, the search result including a document relevant to the query and available to the user in the library affiliated with the user and to which the user is allowed access, and a document relevant to the query and available from a non-library website; and transmitting the search result to the client device in response to the received query.

10. The computer-readable storage medium of claim 9, wherein the holding information includes information regarding online and offline availability of documents associated with the holding information.

11. The computer-readable storage medium of claim 9, wherein the search result includes an access link for the document available to the user in the library affiliated with the user, the access link linking to the document in the library affiliated with the user.

12. The computer-readable storage medium of claim 11, wherein the library affiliated with the user has a link resolver, and wherein the access link links to the link resolver of the library and contains information identifying the document held in the library.

* * * * *